United States Patent [19]

Dyott

[11] 4,135,780

[45] Jan. 23, 1979

[54] OPTICAL FIBER TAP

[75] Inventor: Richard B. Dyott, London, England

[73] Assignee: Andrew Corporation, Orland Park, Ill.

[21] Appl. No.: 797,673

[22] Filed: May 17, 1977

[51] Int. Cl.² .............................................. G02B 5/14
[52] U.S. Cl. .................................................. 350/96.15
[58] Field of Search ............................ 350/96.15, 96.16

[56] References Cited

U.S. PATENT DOCUMENTS

| | | | |
|---|---|---|---|
| 3,777,149 | 12/1973 | Marcatili | 350/96.15 |
| 3,923,377 | 12/1975 | Milton | 350/96.16 |
| 3,931,518 | 1/1976 | Miller | 350/96.15 |
| 3,936,631 | 2/1976 | Muska | 350/96.15 |
| 4,008,061 | 2/1977 | Ramsay | 350/96.15 |
| 4,054,366 | 10/1977 | Barnoski et al. | 350/96.15 |
| 4,076,375 | 2/1978 | Muska et al. | 350/96.15 |

*Primary Examiner*—John K. Corbin
*Assistant Examiner*—Stewart Levy
*Attorney, Agent, or Firm*—Leydig, Voit, Osann, Mayer & Holt, Ltd.

[57] ABSTRACT

An optical fiber tap for tapping optical energy from an optical fiber includes an optical waveguide positioned adjacent to the fiber for collecting light signals therefrom. The optical waveguide preferably has an index of refraction greater than the index of refraction of the fiber. A coupling material interconnects the fiber and the optical waveguide for conducting light from the fiber into the waveguide, the coupling material preferably having an index of refraction between the indexes of the waveguide and the fiber. A photodetector is coupled to one end of the waveguide for receiving light signals therefrom and converting the light signals to corresponding electrical signals. When the tap is used to remove light from the cladding of an optical fiber, pressure is applied to preselected points on the fiber upstream of the tap to couple optical signals from the fiber core into the fiber cladding. When the tap is used to remove light from the core of an optical fiber from which the cladding has been removed, optical signals are collected directly from the fiber core and no pressure assembly is required.

12 Claims, 4 Drawing Figures

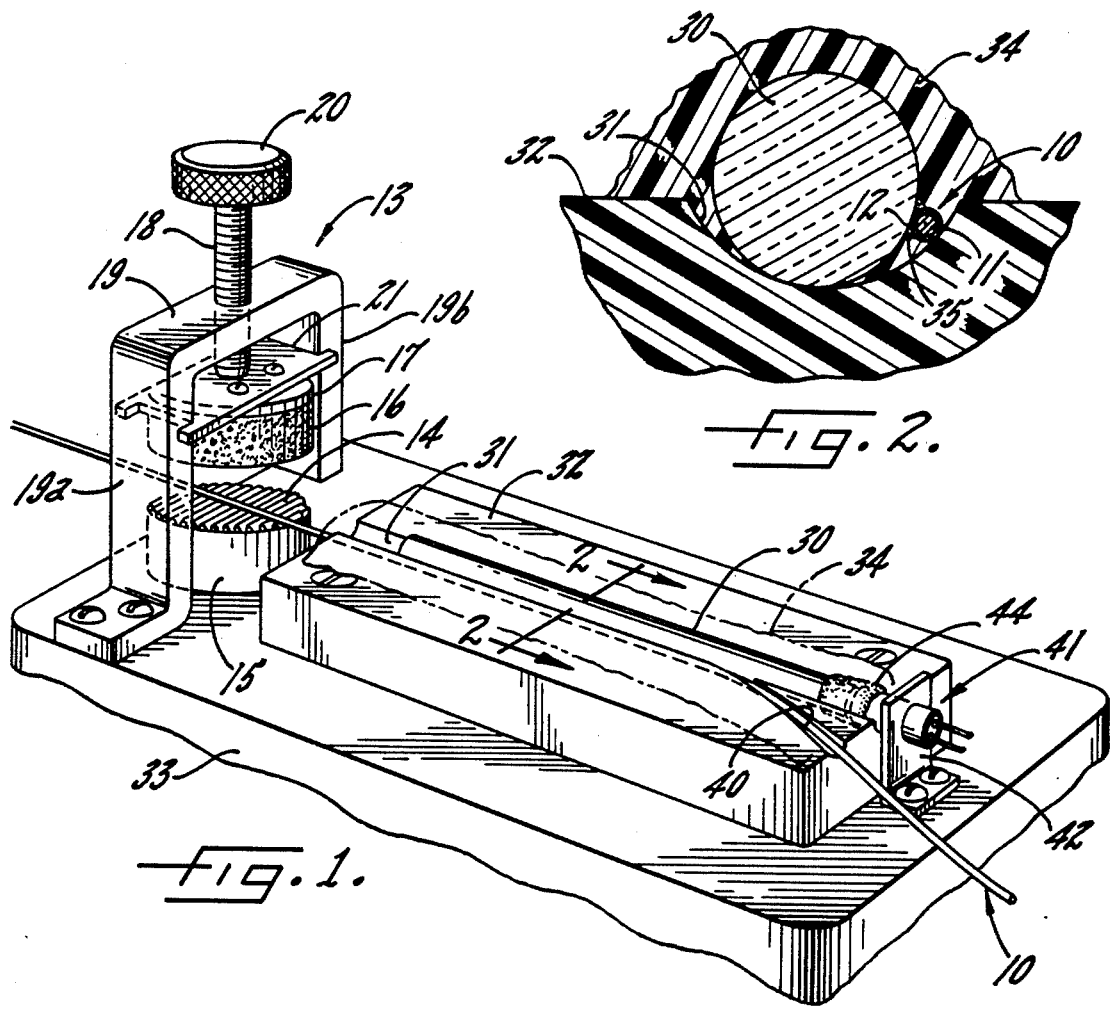
Fig. 1.
Fig. 2.
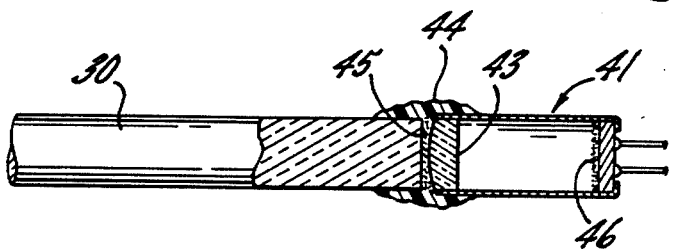
Fig. 3.
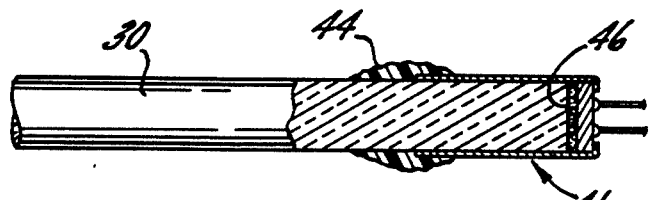
Fig. 4.

OPTICAL FIBER TAP

DESCRIPTION OF THE INVENTION

The present invention relates generally to optical fiber systems and, more particularly, to an improved optical fiber tap for tapping optical signals from an optical fiber.

It is a principal object of the present invention to provide an improved optical fiber tap which is highly efficient, e.g., as high as 90% or greater, and is capable of providing efficiencies as high as 98 to 99%.

It is another object of the invention to provide an improved optical fiber tap of the foregoing type which can be coupled to a suitable detector to provide a high signal-to-noise ratio.

A further object of the invention is to provide such an improved optical fiber tap which is simple to manufacture and, therefore, can be efficiently and economically fabricated.

Other objects and advantages of the invention will be apparent from the following detailed description and the accompanying drawings, in which:

FIG. 1 is a perspective view of an optical fiber tap embodying the invention;

FIG. 2 is an enlarged section taken along line 2—2 in FIG. 1;

FIG. 3 is an enlarged fragmentary view, partially in section, showing the optical input to the photodetector in the tap of FIG. 1; and FIG. 4 is an enlarged fragmentary view, partially in section, showing an alternative embodiment for providing the optical input to the photodetector in the tap of FIG. 1.

While the invention will be described in connection with certain preferred embodiments, it will be understood that it is not intended to limit the invention to those particular embodiments. On the contrary, it is intended to cover all alternatives, modifications and equivalents as may be included within the spirit and scope of the invention as defined by the appended claims.

In accordance with the present invention, there is provided an optical fiber tap comprising the combination of an optical waveguide positioned adjacent to an optical fiber for collecting light signals from the fiber, the optical waveguide having a cross sectional area greater than the cross sectional area of the fiber, and a coupling material interconnecting the fiber and optical waveguide for conducting light from the fiber into the waveguide. The optical waveguide preferably has an index of refraction greater than that of the optical fiber, and the coupling material preferably has an index of refraction between the indexes of the optical fiber and the waveguide.

Turning now to the drawings and referring first to FIG. 1, there is shown an optical fiber tap for tapping optical signals from an optical fiber 10 having a core 11 (see FIG. 2) for guiding optical signals along the fiber and a cladding 12 surrounding the core 11. As is well known in the optical fiber art, the cladding 12 has an index of refraction that is lower than that of the core 11 so that light can be transmitted through the core of the fiber with minimum loss of energy. In the absence of any disturbances, the light that is transmitted through the fiber core 11 always strikes the internal surface of the cladding 12 at an angle of incidence greater than the critical angle of the boundary between the core and cladding and, therefore, is reflected back into the core 11. Thus, when it is desired to tap a portion of the light energy out of the fiber 10 without breaking the fiber, it is necessary to either couple the desired amount of light from the core 11 into the cladding 12, or to obtain direct access to the core 11. The tap provided by this invention is capable of functioning in either of these modes, but has been illustrated in an embodiment intended to tap optical signals from the fiber cladding 12.

In order to couple optical signals from the fiber core 11 into the fiber cladding 12 so that the signals may be removed from the cladding, the tap includes a pressure assembly 13 for applying pressure to preselected points on the fiber. This pressure assembly 13 clamps the optical fiber 10 between a rigid corrugated surface 14 formed on a bottom disc 15 and a resilient pad 16 on the underside of a top disc 17. It is preferred that the corrugations in the corrugated clamping surface 14 be rounded so that they do not physically damage the optical fiber 10. The top disc 17 is carried on the lower end of a threaded shaft 18 which is threaded through a bracket 19 so that the two clamping surfaces 14 and 16 can be pressed into tight engagement with opposite sides of the optical fiber 10 by turning a knob 20 on the upper end of the threaded shaft 18. To prevent rotation of the pad 16 during turning of the shaft 18, the lower end of the shaft is journaled in a guide plate 21 secured to the top of the disc 17 and extending laterally therefrom for guiding engagement with the vertical legs 19a and 19b of the bracket 19. As the two clamping surfaces 14 and 16 are urged against opposite sides of the optical fiber 10, the fiber 10 is deformed at preselected uniform intervals along the length of the fiber to cause a portion of the optical energy to be coupled from the fiber core 11 into the fiber cladding 12. The materials forming the clamping surfaces 14 and 16 should have refractive indices less than that of the fiber cladding 12 to prevent light from leaking out of the fiber in the pressure assembly 13. After the fiber 12 is no longer in contact with the clamping surfaces, the surrounding free space serves as a "cladding" to prevent escape of the light coupled into the cladding 12.

This general type of pressure assembly is known in the art and is described, for example, in U.S. Pat. No. 3,931,518 to S. E. Miller. As described in that patent, and in other publications, the amount of optical power that is coupled from the fiber core into the fiber cladding by the pressure assembly is determined primarily by the length of fiber engaged by the clamping surfaces and the amplitude of the transverse deformation produced in the fiber by the clamping surfaces. The particular modes of the optical signal that are coupled from the fiber core into the fiber cladding may also be controlled by the spacing of the corrugations in the corrugated clamping surface.

In accordance with one important aspect of the present invention, an optical waveguide is positioned adjacent to the optical fiber for collecting the light signals that are coupled into the fiber cladding by the pressure assembly, and a coupling material interconnects the fiber and the waveguide for conducting light energy from the fiber cladding into the waveguide, the waveguide having a cross sectional area substantially greater than the cross sectional area of the optical fiber. As used herein, the term "optical waveguide" refers to an elongated dielectric element which is continuously symmetrical about its longitudinal axis. For the purpose of converting the light signals collected by the optical waveguide into corresponding electrical signals, a photodetector is coupled to one end of the rod.

Thus, in the illustrative embodiment, a directional optical waveguide in the form of an elongated transparent cylindrical rod 30 is positioned parallel to and contiguous with a preselected length of the optical fiber 10 in an elongated groove 31 formed in the top surface of a support plate 32. The support plate 32 is mounted on a base 33 adjacent the pressure assembly 13, and the plate 32 should have a refractive index less than that of the fiber cladding 12 to prevent the loss of light energy from the fiber.

As shown most clearly in FIG. 2, a coupling material 35 is provided on both sides of the line of contact between the rod 30 and the fiber 10 to conduct additional light from the fiber cladding 12 into the waveguide and to assist in holding the fiber 10 in position against the rod 30. This coupling material 35 may be a liquid, jelly, or setting compound. For example, for fibers made of silica or with higher indices of refraction, suitable liquid coupling materials are the following:

| Liquid | Index at sodium D line |
|---|---|
| Diamly Phthalate | 1.487 |
| Toluene | 1.497 |
| Benzene | 1.500 |
| Iodoethane | 1.513 |
| Chlorobenzene | 1.524 |
| 1.2-Dibromoethane | 1.538 |
| Nitrobenzene | 1.553 |
| Bromobenzene | 1.560 |
| Benzyl Benzoate | 1.568 |
| Iodobenzene | 1.619 |
| Quinoline | 1.620 |
| 1-Bromonaphthalene | 1.660 |
| Di-iodo methane | 1.740 |
| Phenyldi-iodoarsine | 1.850 |

Another suitable coupling material is standard optical immersion oil ($M_D$ of 1.524), which can be used with silica fibers and dries to a jelly-like substance which is sufficiently flexible to enable the fiber 10 to be removed from the rod 30 without damage. A setting compound that is suitable for use as a coupling material is the standard polyester resin normally used with fiberglass; this resin is reasonably transparent, sets quickly, has a refractive index of 1.5412 at the $H_eN_e$ wavelength of 632.8 nm., and is ideal for matching with silica fibers. When the coupling material 35 is a liquid, it is held against both the optical fiber 10 and the collector rod 30 by means of surface tension, and this surface tension assists in holding the fiber 10 in a fixed position against the rod. One example of a suitable liquid for this purpose is benzylbenzoate. Because this coupling material 35 is always in a liquid or jelly form when it is applied to the fiber 10 and the rod 30, it provides continuous intimate contact with bold solid surfaces for efficient transmission of light therebetween. If desired, the rod 30 may even be spaced slightly away from the fiber 10, with the coupling material 35 filling the entire space between the rod 30 and the fiber 10. The fiber 10 is held in place by the clamping action of the pressure assembly 13 and the surface tension of the coupling material 35; if desired, an additional clamp may be provided at the opposite end of the base 33 from the pressure assembly 13.

The rod 30 and the coupling material 35 both have indexes of refraction greater than the index of refraction of the fiber cladding 12, so that the light signals that are coupled into the fiber cladding 12 by the pressure assembly 13 are conducted into the coupling material 35 and the rod 30 wherever these elements contact the fiber cladding 12. More specifically, the rod 30 has an index of refraction greater than that of the cladding 12, and the coupling material has an index of refraction between those of the cladding 12 and the rod 30 so that the light that emerges from the cladding 12 into the material 35 passes on into the rod 30. The liquid preferably surrounds the fiber and extends along a sufficient length of the fiber to transfer the light from the fiber cladding 12 as completely as possible to the rod 30. Once the light is transferred into the rod 30, it is trapped therein because all the materials surrounding the rod 30 have an index of refraction lower than that of the rod.

At the opposite end of the support plate 32 from the pressure assembly 13, a curved groove 40 in the top surface of the support plate leads the optical fiber 10 away from the rod 30. At this same end of the support plate, the rod 30 is coupled to a photodiode 41 which receives the light signals and converts them into corresponding electrical signals. This photodiode 41 is supported within a bracket 42 mounted on the base 33 adjacent the end of the support plate 32.

As shown most clearly in FIG. 3, the rod 30 is held in closely spaced relation to the lens 43 of the photodiode 41 by means of an epoxy adhesive 44 or other suitable bonding material. The small space between the end of the rod 30 and the photodiode lens 43 is filled with an index-matching liquid 45 which is held in place by surface tension prior to application of the epoxy adhesive 44. As light exits from the rod 30 and passes through the lens 43, it proceeds through the housing of the photodiode 41 and strikes the photosensitive surface 46 thereof, where the light is converted into analogous electrical signals.

In accordance with one specific aspect of the invention, the cross sectional area of the optical waveguide is substantially coextensive with the input surface of the detector so as to maximize the signal-to-noise ratio. Thus, in the illustrative device the diameters of the cylindrical rod 30 and the photodiode lens 43 are substantially equal.

An alternative arrangement for coupling the rod 30 to the photodiode 41 is shown in FIG. 4. In this particular arrangement, the lens 43 of the photodiode 41 is removed and the rod 30 is extended into the housing in closely spaced relation to the photosensitive surface 46. The rod 30 is held in alignment with the axis of the photodiode 41 by means of epoxy adhesive 44 of other suitable bonding material.

By collecting the optical signals tapped from the fiber 10 in an optical waveguide which is capable of directionally conducting the tapped signals to a detector with virtually no losses, this invention provides an extremely efficient tap. In taps proposed heretofore, the optical signals have been tapped into a body that was neither directional nor designed as an optical waveguide and resulted in considerable scattering and loss of the optical energy. That is, the prior art devices have been grossly inefficient in conducting the tapped energy to the detector because of the nature of the body used to collect the tapped energy and to conduct it to the detector. Examples of these prior art taps are described in U.S. Pat. Nos. 3,931,518; 3,936,631; and 3,982,123, and in "Directional Coupler For Single Multimode Optical Fiber," Stewart et al., the Second European Conference on Optical Fiber Communication, Paris, 1976, pp. 267-268.

With the optical waveguide utilized in the optical tap of the present invention, the efficiency of the tap is determined primarily by the cross sectional area of the waveguide relative to that of the fiber being tapped. By using a waveguide of the proper dimensions, efficiencies in excess of 90%, even as high as 98–99%, can be achieved. Thus, in the illustrative device most of the light from the cladding 12 is coupled via the waveguide 30 to the detector 41, although a certain amount of light continues down the fiber cladding and is lost. Assuming that the light is distributed equally over all modes both in the fiber cladding 12 and in the waveguide 30, with free space as the surrounding medium in both cases, the number of modes carried in each case is given by:

$$N \simeq \frac{V^2}{2}$$

where $V = \frac{2\pi a}{\lambda_o}[n_c^2 - n_o^2]^{\frac{1}{2}}$ $a$ = core radius $a$ = core radius
and $n_c$ and $n_o$ are the "core" and "cladding" indices. In both cases $n_o$ is the index of free space so that $$N \simeq \frac{2\pi^2 a^2}{\lambda_o^2}[n_c^2 - 1]$$

If $N_1$ is the number of modes carried by the first structure (the cladding 12) and $N_2$ the number carried by the second (the rod 30), then the transfer efficiency $\eta$, i.e., the efficiency at which light energy available in the fiber cladding 12 is transferred to the waveguide 30, can be represented as $$\eta = \frac{\text{Power remaining on rod}}{\text{Total Power}}$$
$$\eta = \frac{N_2}{N_1 + N_2} = \frac{1}{1 + \frac{N_1}{N_2}}$$

If
fiber cladding index = $n_2$
Rod index = $n_3$
Fiber diameter = $d_2$
Rod diameter = $d_3$
then $$\eta = \frac{1}{1 + (\frac{d_2}{d_3})^2(\frac{n_2^2 - 1}{n_3^2 - 1})}$$

For a typical optical glass fiber:

| | |
|---|---|
| Core index $n_1$ = 1.620 | |
| Cladding index $n_2$ = 1.549 | At $\lambda_o$ = .6239 μm |
| Overall diameter $d_2$ = 65 | ($H_eN_e$ Laser) |

For a typical lead glass collector rod:

| | |
|---|---|
| Rod index $n_3$ = 1.576 | |
| Rod diameter $d_3$ = 1mm | At $\lambda_o$ = .6328μm |
| $\eta = \frac{1}{1 + (.065)^2[\frac{2.399 - 1}{2.483 - 1}]} = .996$ | |

For a typical graded index silica optical fiber:

$n_2$ = 1.4517: At $\lambda_o$ = 0.90 μm
$d_2$ = 130 μm: ($G_aH_s$ Laser)

and a suitable glass rod would have:

$n_3$ = 1.6054 At $\lambda_o$ = 0.90 μm
$d_3$ = 1mm $$\eta = \frac{1}{1 + (.13)^2[\frac{2.107 - 1}{2.577 - 1}]} = .988$$

As can be seen from the foregoing examples, the optical fiber tap provided by this invention is capable of providing efficiencies as high as 98 to 99%. Furthermore, the tap is simple to manufacture and thus can be efficiently and economically fabricated.

It should be noted that the light can be removed from the fiber by bending the fiber sufficiently to reduce the angle of incidence of the light below the critical angle at the fiber surface, rather than by placing a material of greater refractive index against the fiber surface. In this case, the directional optical waveguide can have an index of refraction less than that of the optical fiber, but it must still be positioned to collect the light as it emerges from the fiber, so that the light can be efficiently conducted to the desired detector.

I claim as my invention:

1. An optical fiber tap for tapping optical signals from an optical fiber having a core for guiding optical signals along the fiber and a cladding surrounding the core, said tap comprising the combination of
   (a) means for applying pressure to preselected points on said fiber to couple optical signals from the fiber core into the fiber cladding,
   (b) an optical waveguide positioned adjacent to a sidewall of said fiber for collecting light signals from the fiber cladding without cutting the fiber, said optical waveguide having an index of refraction and cross sectional area greater than the index of refraction and cross sectional area of said cladding,
   (c) and a coupling material interconnecting said fiber and optical waveguide for conducting light signals from the fiber cladding into said waveguide, said coupling material having an index of refraction between the index of said waveguide and said cladding.

2. An optical fiber tap as set forth in claim 1 wherein the cross sectional area of said optical waveguide is substantially coextensive with the input surface of said detector.

3. An optical fiber tap as set forth in claim 1 wherein said optical waveguide is substantially parallel to said fiber.

4. An optical fiber tap as set forth in claim 1 wherein the cross sectional area of said optical waveguide is at least three times as great as the cross sectional area of said fiber.

5. An optical fiber tap as set forth in claim 1 which includes a photodetector coupled to one end of said optical waveguide for receiving light signals therefrom and converting said light signals to corresponding electrical signals.

6. An optical fiber tap as set forth in claim 1 wherein said pressure applying means includes means for deforming said fiber at preselected points spaced along the length of the fiber to cause a portion of the optical signal to be coupled from the fiber core into the fiber cladding.

7. An optical fiber tap as set forth in claim 1 wherein said pressure applying means comprises a rigid corrugated surface on one side of the fiber and a resilient surface on the other side of the fiber for pressing the fiber into the corrugations of the rigid surface.

8. An optical fiber tap for tapping optical signals from an optical fiber having a core for guiding optical signals along the fiber and a cladding surrounding the core, said tap comprising the combination of
   (a) an optical waveguide positioned adjacent to a sidewall of said fiber for collecting light signals from the fiber cladding without cutting the fiber, said fiber being bent sufficiently to reduce the angle of incidence of light signals within the fiber below the critical angle at the fiber surface so that said light signals are removed from said fiber,
   (b) and a coupling material interconnecting said fiber and optical waveguide for conducting light signals from said fiber cladding into said waveguide, said coupling material having an index of refraction lower than the index of said waveguide.

9. An optical fiber tap as set forth in claim 8 wherein said optical waveguide has an index of refraction greater than the index of refraction of said fiber, and said coupling material has an index of refraction between the indexes of said fiber and said waveguide.

10. An optical fiber tap as set forth in claim 8 wherein the cross sectional area of said optical waveguide is at least three times as great as the cross sectional area of said fiber.

11. An optical fiber tap as set forth in claim 8 which includes a photodetector coupled to one end of said optical waveguide for receiving light signals therefrom and converting said light signals to corresponding electrical signals.

12. An optical fiber tap as set forth in claim 11 wherein the cross sectional area of said optical waveguide is substantially coextensive with the input surface of said detector.

* * * * *